(12) United States Patent
Takahashi et al.

(10) Patent No.: US 9,071,080 B2
(45) Date of Patent: Jun. 30, 2015

(54) POWER SUPPLY UNIT, PROCESSING SYSTEM, AND CONTROL METHOD

(75) Inventors: Ryo Takahashi, Kanagawa (JP); Masato Kajimoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 824 days.

(21) Appl. No.: 12/796,143

(22) Filed: Jun. 8, 2010

(65) Prior Publication Data

US 2010/0332864 A1 Dec. 30, 2010

(30) Foreign Application Priority Data

Jun. 24, 2009 (JP) ................................ 2009-149545

(51) Int. Cl.
*G06F 1/26* (2006.01)
*H02J 1/14* (2006.01)

(52) U.S. Cl.
CPC ........................................ *H02J 1/14* (2013.01)

(58) Field of Classification Search
CPC ............................................................ G06F 1/26
USPC ........................................................ 713/300
See application file for complete search history.

(56) References Cited

U.S. PATENT DOCUMENTS 6,041,414 A * 3/2000 Kikuchi ........................ 713/300
6,804,616 B2 * 10/2004 Bodas ............................ 702/61
6,879,139 B2 * 4/2005 Brown et al. .................. 323/299

FOREIGN PATENT DOCUMENTS

JP 61-169922 7/1986
JP 2003-345467 5/2003

* cited by examiner

*Primary Examiner* — Kim Huynh
*Assistant Examiner* — Eric Chang
(74) *Attorney, Agent, or Firm* — Dentons US LLP

(57) ABSTRACT

A power supply unit includes a communication unit and a control unit. The communication unit is capable of communicating with a different power supply unit. The control unit determines a number of processing units connected thereto, controls powers of the processing units connected thereto so that one of a turn-on operation and a turn-off operation is performed on the powers of the processing units in sequence, and controls the powers of the processing units connected thereto so that one of the turn-on operation and the turn-off operation is performed on the powers in a predetermined priority order in a relationship with processing units connected to the different power supply unit through communication with the different power supply unit.

7 Claims, 12 Drawing Sheets

POWER SUPPLY UNIT, PROCESSING SYSTEM, AND CONTROL METHOD

BACKGROUND OF THE INVENTION

1. Field of the Invention

The present invention relates to a power supply unit that controls a power source, a processing system including a power supply unit and a processing unit, and a control method.

2. Description of the Related Art

In the past, there have been proposed various methods of controlling the start and stop of the power supplies for various devices such as a motherboard and a disc drive that are provided to an information processing apparatus such as a PC (personal computer) and a server.

Japanese Patent Application Laid-open No. 2003-345467 (paragraphs 0012 and 0019 to 0021, FIG. 1) (hereinafter, referred to as Patent Document 1) discloses an information processing apparatus 1 in which a power supply portion 3, a motherboard 5, a hard disc drive apparatus, a CD drive apparatus, and a floppy (registered trademark) disc apparatus are built in a casing 2 thereof. A power supply controller 52 mounted on the motherboard 5 performs on/off control on the power supply portion 3 on the basis of a signal from a main-body power supply switch 6 provided to the casing 2 or a power supply switch 13 provided to a keyboard 10. As a result, the power supply to the motherboard 5, the hard disc drive, and the like from the power source unit 3 is controlled.

It is to be noted that Japanese Patent Application Laid-open No. Sho 61-169922 (lower right column of p. 3, FIG. 1) (hereinafter, referred to as Patent Document 2) is given as a document relating to the present application.

SUMMARY OF THE INVENTION

Incidentally, a power supply control method used for the information processing apparatus disclosed in Patent Document 1 is a centralized control method for supplying power to a plurality of devices such as the motherboard and the disc drive from one power supply portion. In the case of such a centralized control method, the capacity of the power that can be supplied by the power supply portion have a limitation, which causes a problem in that the number of devices such as the motherboard and the disc drives that can be connected to the power source portion is limited.

Further, in the method of controlling the power supply portion disclosed in Patent Document 1, there is a problem in that only simultaneous on/off control can be performed on the various devices connected to the power supply portion.

In view of the above-mentioned circumstances, it is desirable to provide techniques of a power supply unit and the like capable of managing the on and off of the power of the plurality of processing units in a distributed manner from the other power supply units and capable of turning on and off the power of the plurality of processing units in a predetermined order.

According to an embodiment of the present invention, there is provided a power supply unit including a communication unit and a control unit.

The communication unit is capable of communicating with a different power supply unit.

The control unit determines a number of processing units connected thereto.

Further, the control unit controls powers of the processing units connected thereto so that one of a turn-on operation and a turn-off operation is performed on the powers of the processing units in sequence.

Further, the control unit controls the powers of the processing units connected thereto so that one of the turn-on operation and the turn-off operation is performed on the powers in a predetermined priority order in a relationship with processing units connected to the different power supply unit through communication with the different power supply unit.

In this embodiment, each of the power supply units adopts a distribution-type power control method of controlling the turn-on or turn-off operation on the powers of the processing units connected thereto. Further, the power supply units can communicate with each other. Therefore, by increasing the number of power supply units, the number of the processing units can also be increased. In this case, the number of the processing units can indefinitely be increased.

In addition, in this embodiment, a plurality of processing units can be started up or shut down in sequence in conjunction with the different power supply unit.

Here, for example, in the case where the PCI-Express is used for connection of the units, there may arise a problem in that the plurality of processing units are necessary to be started up and shut down in a predetermined order due to a problem of device recognition in Root/End connection.

In this embodiment, as described above, it is possible to the startup operation or the shutdown operation on the plurality of the processing units in conjunction with the different power supply unit. Thus, it is possible to flexibly cope with the above-mentioned problem.

In the power supply unit, the control unit may judge, when the powers are turned on, whether a response signal with respect to a check signal for checking whether the different power supply unit is connected in a rear stage is input from the different power supply unit in the rear stage.

In the power supply unit, the control unit may control, when the response signal is not input, the powers to sequentially start up the processing units connected thereto.

In this case, the control unit may control, when the response signal is input, the powers to sequentially start up the processing units connected thereto after a startup completion signal is input. The startup completion signal indicates that the startup of the processing units connected to the different power supply unit in the rear stage is completed.

As a result, it is possible to sequentially turn on the powers of the processing units connected to the power supply unit from the last stage.

In the power supply unit, the control unit may control the powers so that the processing units connected thereto are started up in a descending order of distance therefrom in an electrical connection position.

As a result, it is possible to perform the sequential turn-on operation from the powers of the processing units in the last stage from the power supply unit in the last stage. Here, for example in the case where the PCI-Express is used for the connection of the units, there may arise a problem in that the startup operation has to be performed from the processing unit in the last stage in sequence. The embodiment of the present invention is particularly effective for the case where such a problem arises.

In the power supply unit, the control unit may output, when the powers are turned off, a turn-off completion signal to the different power supply unit in the rear stage, the turn-off completion signal indicating that the turn-off of the processing units connected thereto is completed.

In the power supply unit, the control unit may control, when the turn-off completion signal is input from the different power supply unit in a front stage, the powers so that the processing units connected thereto are sequentially shut down.

As a result, it is possible to sequentially turn off the powers from the processing units connected to the head power supply unit in the front stage.

In the power supply unit, the control unit may control the powers so that the powers of the processing units connected thereto are turned off in an ascending order of distance therefrom in an electrical connection position.

As a result, it is possible to sequentially turn off the powers from the processing units connected to the head power supply unit in the front stage. Here, for example in the case where the PCI-Express is used for the connection of the units, there may arise a problem in that the shutdown operation has to be performed from the processing unit in the forefront stage in sequence. The embodiment of the present invention is particularly effective for the case where such a problem arises.

In the power supply unit, the control unit may judge whether the power supply unit is a head power supply unit or a relay power supply unit in a relationship with the different power supply unit, and may control, based on a judgment result as to whether the power supply unit is the head power supply unit or the relay power supply unit, the powers of the processing units connected thereto so that one of the turn-on operation and the turn-off operation is performed on the powers in a predetermined priority order in a relationship with the processing units connected to the different power supply unit through the communication.

As a result, the power supply unit automatically judges whether the power supply unit concerned is a head power supply unit or a relay power supply unit. Accordingly, regardless of a connection position of the power supply unit with respect to the different power supply unit, the power supply unit can be effectively operated.

The power supply unit may further include a power supply switch.

In this case, the control unit may judge, based on a shift of the power supply switch thereof, that the power supply unit including the power supply switch shifted is the head power supply unit in the relationship with the different power supply unit.

In the case of the embodiment, when the power supply switch is shifted, it is judged that the power supply unit including the power supply switch is the head power supply unit. Thus, in the connection relationship among the power supply units, it is possible to cope with the case where the power supply units are connected in the ring-shaped manner. Even in such a case, the power supply unit can be effectively operated.

According to another embodiment of the present invention, there is provided a processing system including a plurality of processing units and a plurality of power supply units.

The plurality of power supply units each include a communication unit and a control unit.

The communication unit is capable of communicating with a different power supply unit.

The control unit determines a number of processing units connected thereto, out of the plurality of processing units.

Further, the control unit controls powers of the processing units connected thereto so that one of a turn-on operation and a turn-off operation is performed on the powers of the processing units in sequence.

Further, the control unit controls the powers of the processing units connected thereto so that one of the turn-on operation and the turn-off operation is performed on the powers in a predetermined priority order in a relationship with processing units connected to the different power supply unit through communication with the different power supply unit.

According to another embodiment of the present invention, there is provided a control method including communicating with a different power supply unit.

The control method further includes determining a number of processing units connected to a power supply unit.

The control method further includes controlling powers of the processing units connected to the power supply unit so that one of a turn-on operation and a turn-off operation is performed on the powers of the processing units in sequence.

The control method further includes controlling the powers of the processing units connected thereto so that one of the turn-on operation and the turn-off operation is performed on the powers in a predetermined priority order in a relationship with processing units connected to the different power supply unit through communication with the different power supply unit.

As described above, according to the embodiments of the present invention, it is possible to perform the distribution management on the on and off of the powers of the plurality of the processing units from the different power supply unit. Further, it is possible to provide the technique such as the power supply unit and the like capable of turning on and off the powers of the plurality of the processing units in a predetermined order.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

<First Embodiment>

(Overall Structure of Processing System and Structures of Respective Portions)

Figure 1:
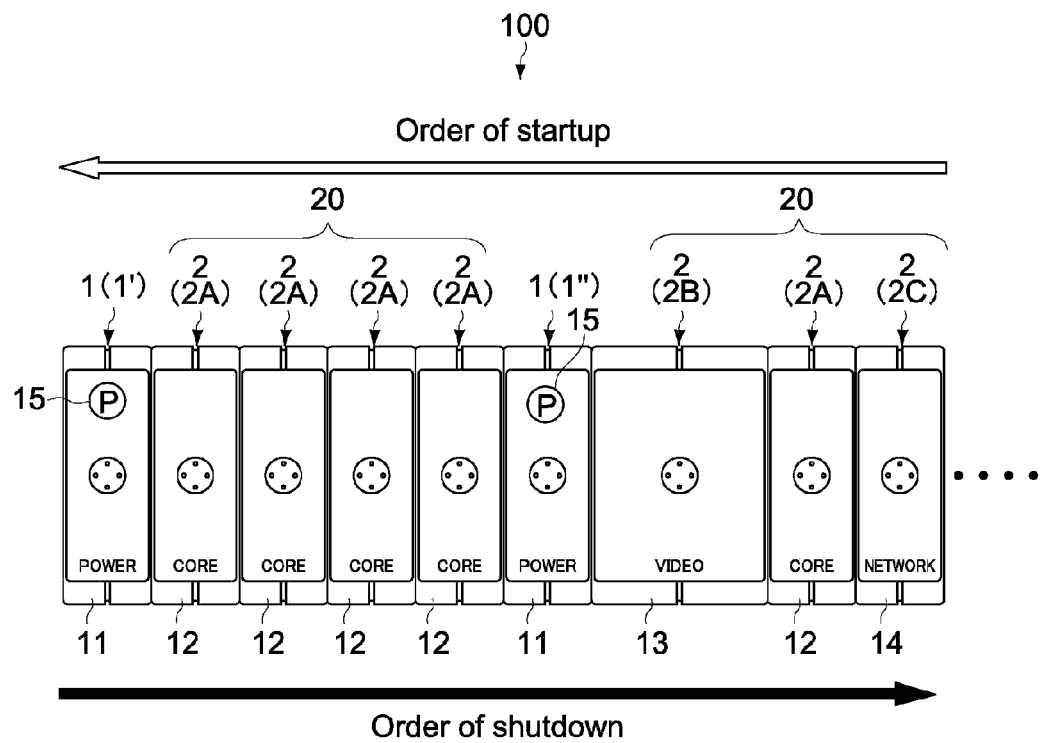
FIG. 1 is a diagram showing a processing system according to an embodiment of the present invention.
Figure 2:
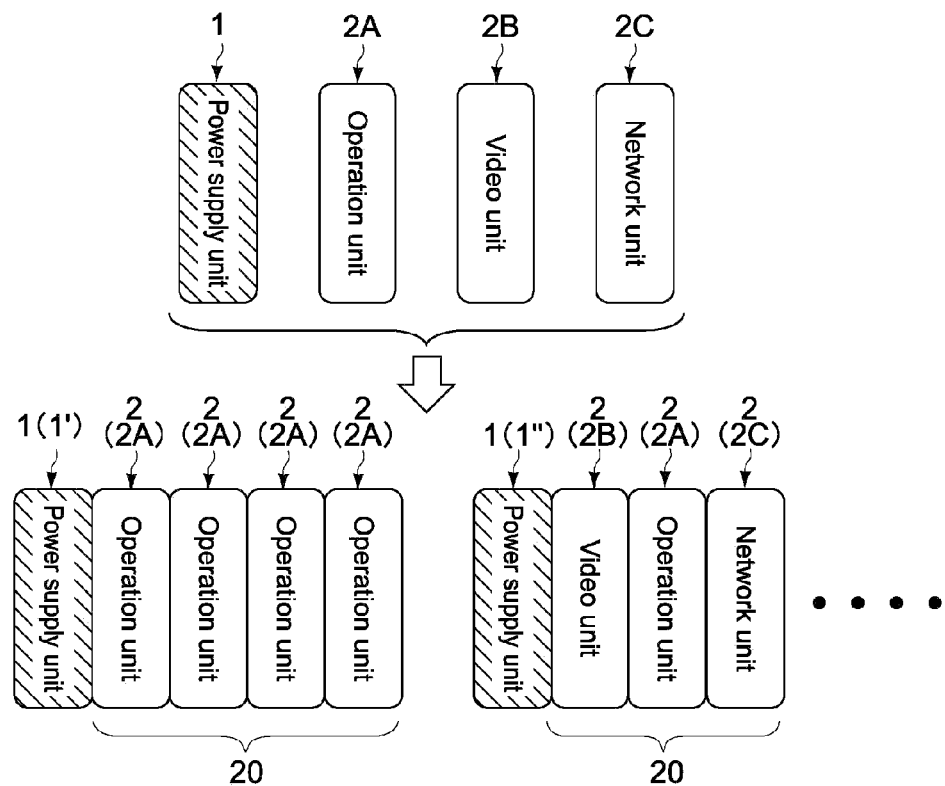
FIG. 2 is a schematic diagram showing a processing system according to the embodiment of the present invention.

FIG. 1 is a diagram showing a processing system according to a first embodiment of the present invention. FIG. 2 is a schematic diagram showing the processing system.

As shown in FIGS. 1 and 2, a processing system 100 includes a plurality of power supply units 1 and a plurality of processing units 2.

The processing unit 2 is formed of an operation unit 2A, a video unit 2B, or a network unit 2C. It should be noted that, in this specification, the processing unit 2 refers to one of the operation unit 2A, the video unit 2B, and the network unit 2C.

As shown in FIG. 2, a user can arbitrarily select necessary units in accordance with a necessary size from the power supply unit 1, the operation unit 2A, the video unit 2B, and the network unit 2C, to structure the processing unit 100.

The power supply unit 1 includes a casing 11 having a rectangular parallelepiped shape. On the front surface side of the casing 11, a power supply switch 15 that is exposed from the front surface of the casing 11 is provided. It should be noted that the shape of the casing 11 or the position of the power supply switch 15 can be changed as appropriate.

The power source unit 1 includes a microcontroller 5 (control unit) (see, FIG. 3) in the casing 11. The microcontroller 5 controls the supply of the power to the respective processing units 2 and the start and stop thereof.

In the following description, a group of the processing units 2 that is subjected to the supply of the power and the control on the start and stop thereof by one power supply unit 1 is referred to as a processing unit group 20. The maximum number of processing units 2 included in the processing unit group 20, that is, the maximum number of processing units 2 connected to one power supply unit 1 is predetermined, for example, set to four. It should be noted that the maximum number of units connected can be changed as appropriate.

The operation unit 2A includes a casing 12 having a rectangular parallelepiped shape. In the casing 12, a CPU board on which a CPU (central processing unit) (or MPU (micro processing unit)) or the like is mounted is incorporated.

The video unit 2B includes a casing 13 having a rectangular parallelepiped shape. In the casing 13, a graphic board on which a i (graphics processing unit), a VRAM (video random access memory), or the like is mounted is incorporated.

The network unit 2C includes a casing 14 having a rectangular parallelepiped shape. In the casing 14, a network board is incorporated.

The units 1 and 2 are electrically connected to one another through a power supply line. In addition, the units are electrically connected to one another by a PCI-Express.

In the description of the first embodiment, out of the plurality of power supply units 1, the power supply unit 1 disposed on the left end is referred to as a head power supply unit 1', and the other power supply units 1 are referred to as relay power supply units 1".

In addition, in the description of the first embodiment, in the positional relationship among the units 1 and 2, the left side may be referred to as a front stage, and the right side may be referred to as a rear stage.

Here, in FIG. 1, an order of startup and an order of shutdown in the processing system 100 are shown. In this embodiment, as shown in FIG. 1, the powers of the processing units 2 are turned on sequentially from the rear stage side based on the control of the power supply unit 1 (microcontroller 5), and the powers of the processing units 2 are turned off sequentially from the front stage side.

The turning on and off of the units is controlled in the above-mentioned orders for the following reason.

As described above, for the connection of the units, the PCI-Express is used. In the case where the PCI-Express is used for the connection of the units, there arises a problem in that the processing units are necessary to be started up and shut down in a predetermined order due to a problem of device recognition in Root/End connection. In view of this, in this embodiment, the powers the processing units 2 are turned on sequentially from the rear stage side and turned off sequentially from the front stage side. It should be noted that the details of the power supply control by the power supply unit 1 (microcontroller 5) will be described later.

Figure 3:
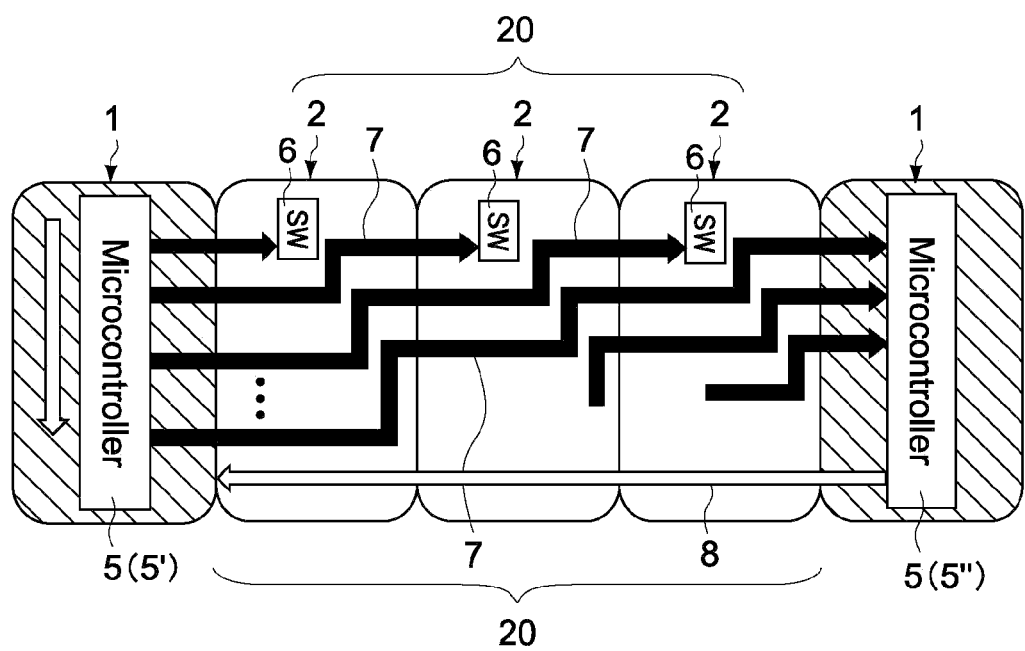
FIG. 3 is a schematic diagram showing a connection state among units that constitute the processing system.

FIG. 3 is a schematic diagram showing a connection state among the units.

As shown in FIG. 3, in the power supply unit 1, the microcontroller 5 is provided, and in the processing unit 2, the switch 6 for turning on and off the power is provided. A microcontroller 5' of the power supply unit 1 in the front stage (left side in FIG. 3) is electrically connected to the switches 6 of the processing unit group 20 disposed on the rear stage side through a control signal line 7. The microcontroller 5' outputs a startup control signal or a shutdown control signal through the control signal line 7, to control the turning on and off of the power of the processing unit group 20 disposed on the rear stage side.

The microcontroller 5' of the power source unit 1 in the front stage is electrically connected to a microcontroller 5" of the power supply unit 1 in the rear stage (right side in FIG. 3) through the control signal line 7. It should be noted that the microcontroller 5' on the front stage side and the microcontroller 5" on the rear stage side are electrically connected to each other also through a signal line 8.

The control signal lines 7 from the microcontroller 5' are shifted to the upper level stepwise in each of the processing units 2. That is, the control signal lines 7 are shifted to the upper level stepwise from the input side to the output side in each of the processing units 2. The reason why the control signal lines 7 from the micro controller 5 are shifted to the upper level stepwise in each of the processing units 2 will be described.

As described above, the user can arbitrarily select necessary units 1 and 2 from the units 1 and 2 to structure the processing system 100 according to this embodiment. In this case, the number of processing units 2 connected to one power supply unit 1 and the connected positions thereof are unclear.

The assumption is made that the control signal lines 7 are not shifted to the upper level stepwise from the input side and the output side in the processing unit 2 but set at the same level. In this case, depending on a position where the processing unit 2 is connected to the power supply unit 1, the control signal line 7 through which the startup and shutdown control signals are input from the microcontroller 5 is different for each processing unit 2.

In view of this, in this embodiment, the control signal lines 7 from the microcontroller 5 are shifted to the upper level stepwise in each of the processing units 2. With this structure, as shown in FIG. 3, even if the processing units 2 are disposed at any positions, the startup and shutdown control signals from the microcontroller 5' can be input from the uppermost control signal line 7. Thus, regardless of the positions where the processing units 2 are connected to the power supply unit 1, the processing units 2 can be effectively started up and shut down.

(Description on Operation)

Next, the operation of the processing system 100 will be described. It should be noted that the operation of the power supply unit 1 will be mainly described in the description on the operation of the processing system 100.

(Processing at Time when Power is Turned on)

First, the operation when the power of the processing system 100 is turned on will be described.

Figure 4:
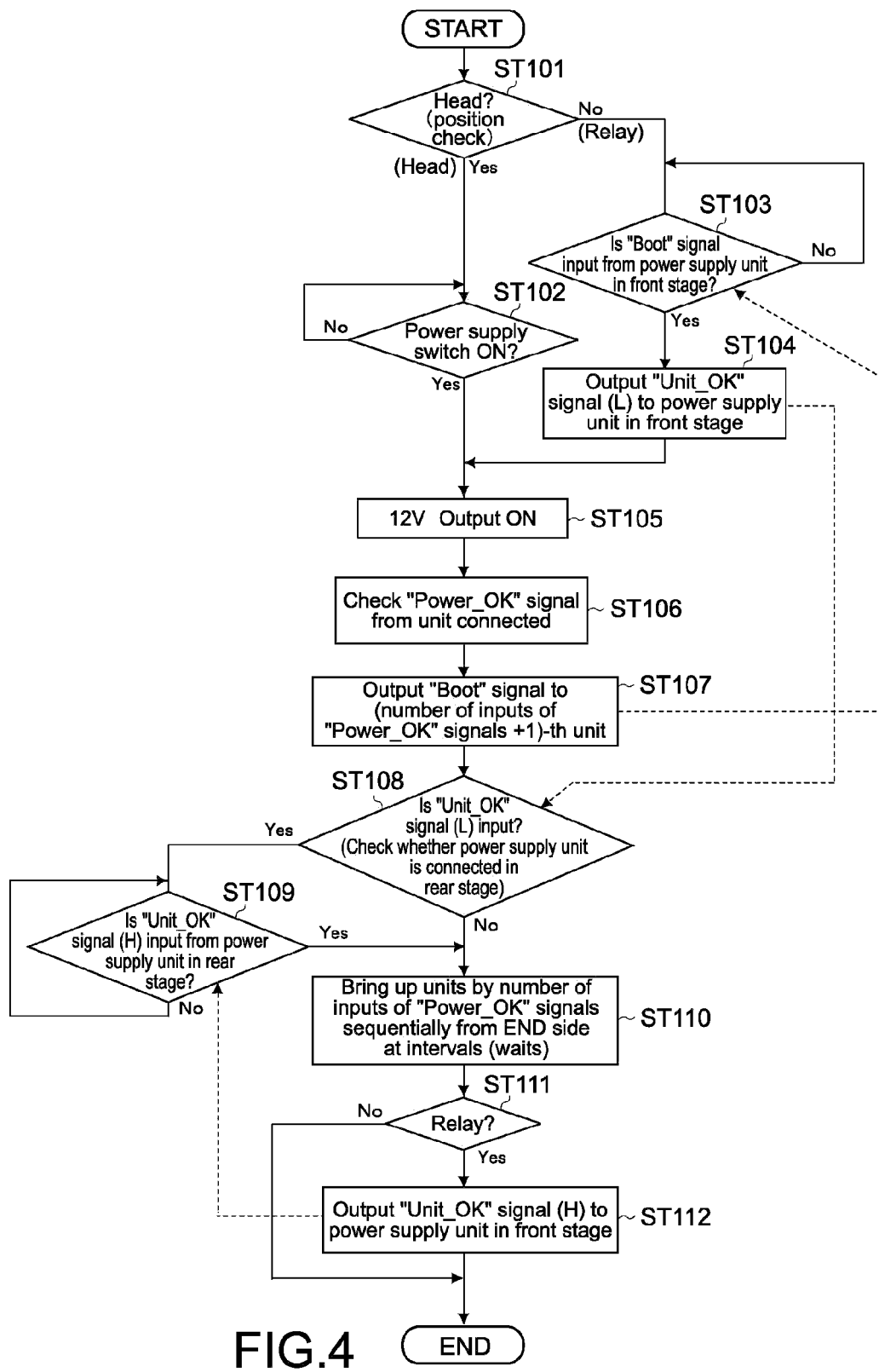
FIG. 4 is a flowchart showing an operation in the case where a power supply unit powers on a processing unit.
Figure 5:
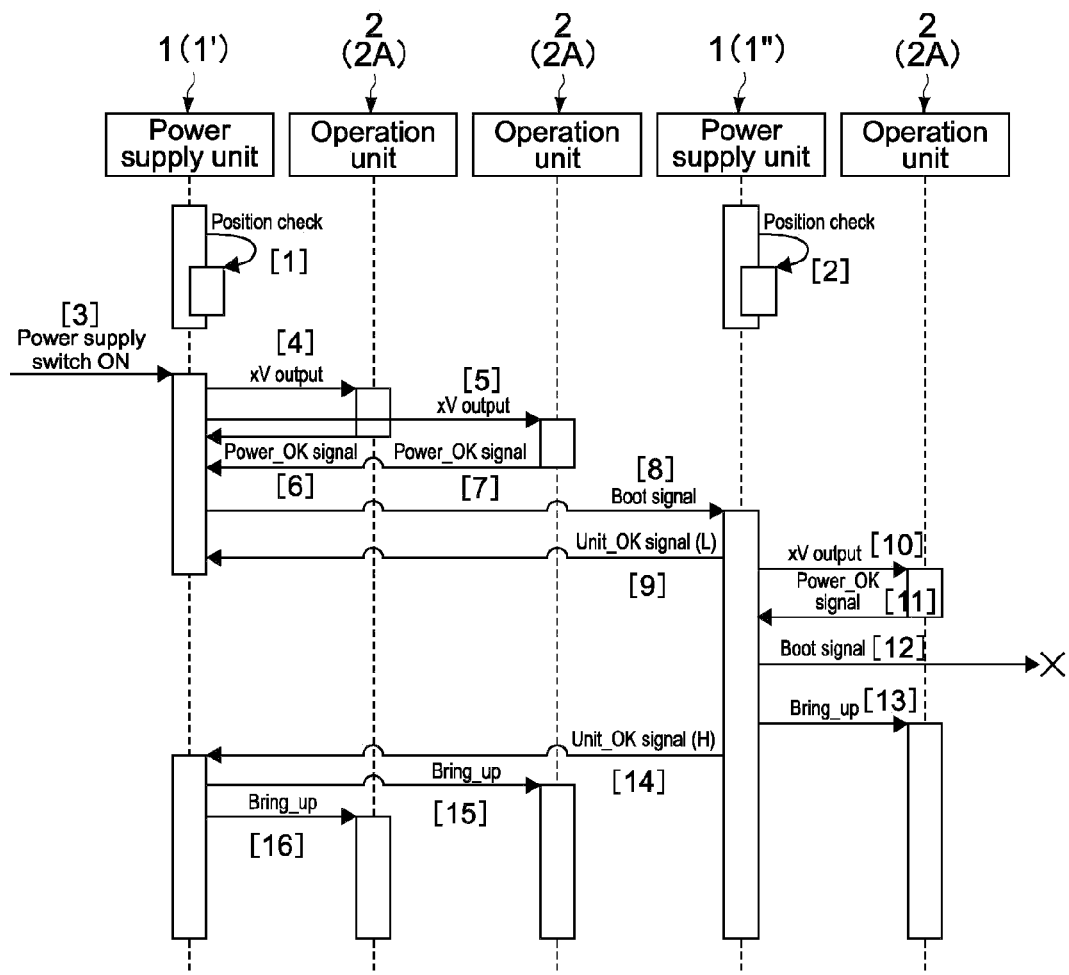
FIG. 5 is a sequence diagram showing a startup operation of the processing system according to the embodiment of the present invention.

FIG. 4 is a flowchart showing an operation in the case where the power supply unit turns on the power of the processing unit. FIG. 5 is a sequence diagram showing the operation at the time of starting up the processing system. It should be noted that FIG. 5 shows the case where two processing units 2 (2A) are connected to the head power supply unit 1', and one processing unit 2 (2A) is connected to the relay power supply unit 1" for ease of the explanation.

The microcontroller 5 of the power supply unit 1 judges whether the power supply unit 1 concerned is the head power supply unit 1' or the relay power supply unit 1" based on the relationship with the other power supply unit 1 (Step 101) (see, FIG. 5 and [2]). Typically, the microcontroller 5 of the power supply unit 1 judges whether the other power supply unit 1 is connected in the rear stage. Based on the judgment result, the connected position thereof is determined.

In the case where it is judged that the power supply unit 1 concerned is the head one (YES in Step 101), the microcontroller 5 judges whether a user presses the power supply switch 15 provided on the front side of the power supply unit 1, and a signal of turning on the power supply switch is input from the power supply switch (Step 102).

In the case where the user presses the power supply switch 15, and the signal of turning on the power supply switch is input from the power supply switch 15 (YES in Step 102), the microcontroller 5 performs the subsequent processing of Step 105. On the other hand, in the case where the signal of turning on the power supply switch is not input from the power supply switch 15 (NO in Step 102), the process returns to Step 102 again, and the microcontroller 5 judges whether the signal of turning on the power supply switch is input or not.

That is, when the power supply unit 1 is judged to be the head power supply unit 1', the power supply unit 1' is brought into a standby state of turning on the power supply switch 15 provided thereto.

In Step 101, when the power supply unit 1 is not judged to be the head power supply unit (NO in Step 101), that is, when the power supply unit 1 concerned is judged to be the relay power supply unit 1", the microcontroller 5 performs the processing of Step 103.

In Step 103, the microcontroller 5 judges whether a "Boot" signal is input from the power supply unit 1 in the front stage through the control signal line 7.

In the case where the "Boot" signal is input from the power source unit 1 in the front stage (YES in Step 103), the process proceeds to Step 104. On the other hand, in the case where the "Boot" signal is not input (NO in Step 103), the process returns to Step 103, and the microcontroller 5 judges again whether the "Boot" signal is input from the power supply unit 1 in the front stage.

That is, when the power supply unit 1 concerned is judged to be the relay power supply unit 1", the power supply unit 1" is brought into a standby state of the input of the "Boot" signal from the power supply unit 1 in the front stage.

In the case where the "Boot" signal is input from the power supply unit 1 in the front stage (YES in Step 103) (see, FIG. 5), the microcontroller 5 outputs a "Unit_OK" signal (Low) to the power source unit 1 in the front stage through the signal line 8 (Step 104) (see, FIG. 5).

In the case where the user presses the power supply switch 15, and the signal of turning on the power supply switch is input from the power supply switch 15 in Step 102 (see, FIG. 5), or in the case where the "Unit_OK" signal is output to the power supply unit 1 in the front stage in Step 104 (see, FIG. 5), the microcontroller 5 performs the subsequent processing of Step 105.

In Step 105, the microcontroller 5 supplies a voltage of 12 V to the processing unit group 20 connected thereto (see, FIG. 5, [5], and [10]).

When the voltage of 12 V is supplied from the power supply unit 1, the processing units 2 each output a "Power_OK" signal to the power supply unit 1 (see, FIG. 5, [7], and [11]). It should be noted that the voltage supplied to the processing units 2 is not limited to 12 V, and can of course be another value.

Next, the microcontroller 5 counts the inputs of the "Power_OK" signals from the processing unit group 20 connected thereto (Step 106). By counting the inputs of the "Power_OK" signals, the microcontroller 5 can recognize the number of processing units 2 connected thereto.

When the inputs of the "Power_OK" signals are counted, the microcontroller 5 outputs the "Boot" signal to the (number of inputs of "Power_OK" signals+1)-th unit (i.e., power supply unit 1 in the rear stage) through the control signal line 7 (Step 107) (see, FIG. 5 and [12]).

When the "Boot" signal is output, the microcontroller 5 judges whether the "Unit_OK" signal (L) is input from the power supply unit 1 in the rear stage (Step 108).

In the case where the power supply unit 1 is connected in the rear stage, the "Unit_OK" signal (L) is input from the power supply unit 1 in the rear stage (Steps 103 and 104) (see, FIG. 5).

On the other hand, in the case where the power supply unit 1 is not connected in the rear stage, the "Unit_OK" signal (L) is not input (see, FIG. 5).

Thus, the microcontroller 5 can determine whether the power supply unit 1 is connected in the rear stage.

In the case where the "Unit_OK" signal (L) is input from the power supply unit 1 in the rear stage (YES in Step 108), the microcontroller 5 judges whether the "Unit_OK" signal (High) is input from the power supply unit 1 in the rear stage (Step 109).

In the case where the "Unit_OK" signal (H) is input from the power supply unit 1 in the rear stage (YES in Step 109), the process proceeds to Step 110. On the other hand, in the case where the "Unit_OK" signal (H) is not input from the power supply unit 1 in the rear stage (NO in Step 109), the microcontroller 5 performs the processing of Step 109 again and judges whether the "Unit_OK" signal (H) is input from the power supply unit 1 in the rear stage again.

That is, in the case where the power supply unit 1 is connected in the rear stage, the power supply unit 1 is brought into a standby state of the input of the "Unit_OK" signal (H) from the power supply unit 1 in the rear stage.

In Step 108, in the case where the "Unit_OK" signal (L) is not input (NO in Step 108), the microcontroller 5 performs the subsequent processing of Step 110. That is, in the case where the power supply unit 1 is not connected in the rear stage (in the case where the power supply unit 1 concerned is disposed in the last stage), the microcontroller 5 performs the processing of Step 110.

In Step 110, the microcontroller 5 outputs startup control signals to the units by the number of inputs of the "Power_OK" signals counted in Step 107 sequentially from the END side at intervals (waits) (see, FIG. 5). As a result, the power is turned on sequentially from the processing unit 2 in the last stage in the processing unit group 20 connected to the power supply unit 1 in the last stage.

Next, the microcontroller 5 judges whether the power supply unit 1 to which the microcontroller 5 is provided is the relay power supply unit 1" (Step 111). In the case where the power supply unit 1 concerned is the relay power supply unit 1" (YES in Step 111), the "Unit_OK" signal (H) is output to the power supply unit 1 in the front stage (Step 112) (see, FIG. 5). Then, the processing is terminated.

In Step 109, when the "Unit_OK" signal (H) is input to the power supply unit 1 in the standby state of the input of the "Unit_OK" signal (H) from the power supply unit 1 in the rear stage (YES in Step 109), the microcontroller 5 performs the processing of Step 110. That is, when the "Unit_OK" signal (H) is input from the power supply unit in the rear stage, the microcontroller 5 sequentially turns on the powers of the processing units 2 from the one connected in the last stage, out of the processing unit group 20 connected thereto (Step 110) (see, FIG. 5 and [16]).

After that, it is judged whether the power supply unit 1 concerned is the relay power supply unit 1". In the case of the relay power supply unit 1" (YES in Step 111), the "Unit_OK" signal (H) is output to the power supply unit 1 in the front stage, and the processing is terminated. On the other hand, in the case of the head power supply unit 1' (NO in Step 111), the "Unit_OK" signal (H) is not output, and the processing is terminated.

By the processings shown in FIG. 4, the power supply units 1 can sequentially start up the processing units 2 connected thereto from the rear stage side and can sequentially starts up the processing units 2 that constitute the processing system 100 from the rear stage side in conjunction with the other power supply unit 1. As a result, it is possible to avoid the above-mentioned problem of the order of turning on the powers in the case where the PCI-Express is used for the connection of the units.

(Processing at Time when Power is Turned Off)

Next, a description will be given on an operation of the processing system 100 at the time when the power is turned off.

Figure 6:
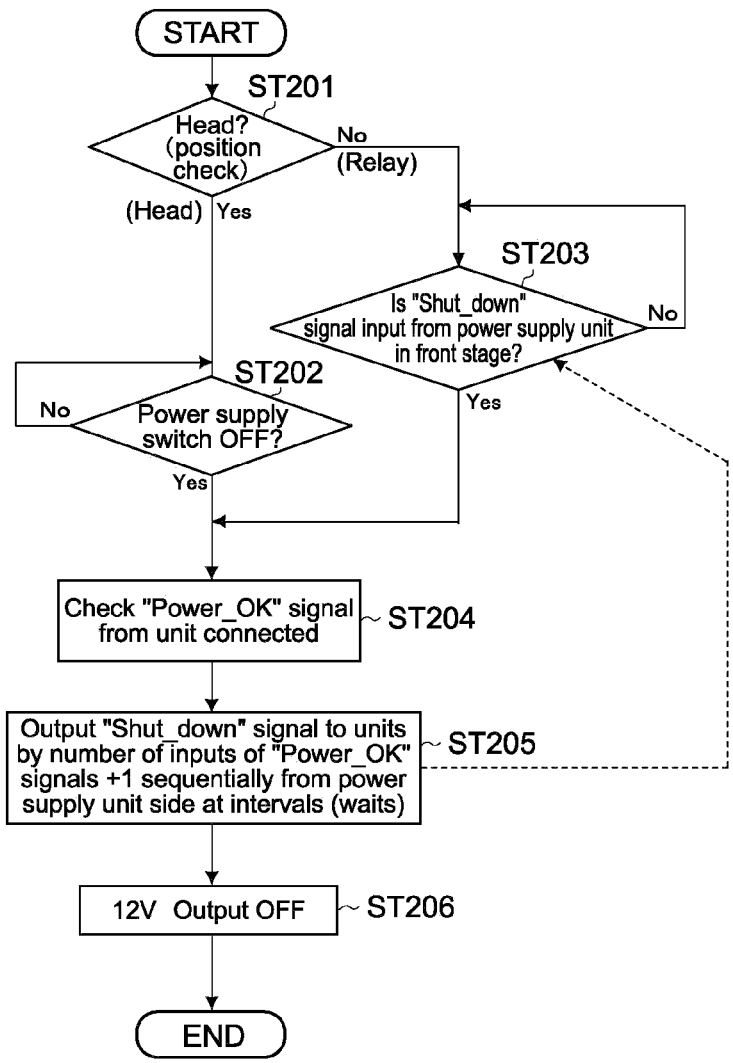
FIG. 6 is a flowchart showing an operation in the case where the power supply unit turns off the power of the processing unit.
Figure 7:
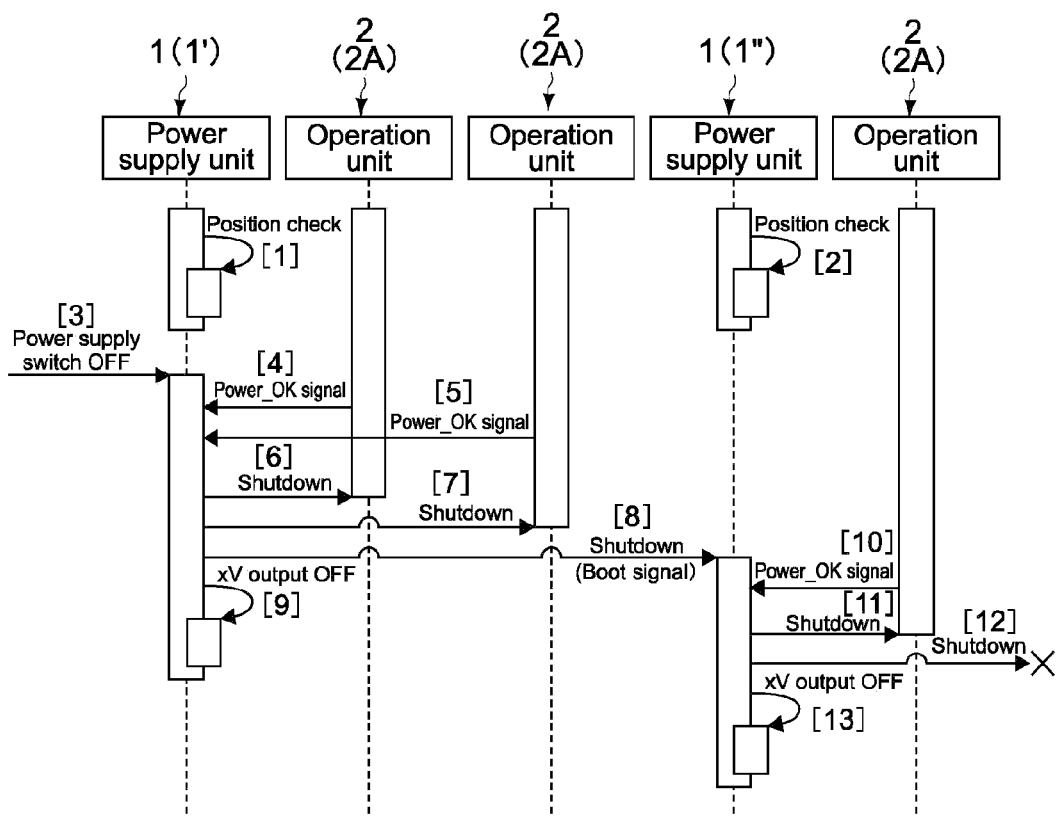
FIG. 7 is a sequence diagram showing a turn-off operation of the power of the processing system according to the embodiment of the present invention.

FIG. 6 is a flowchart showing the operation in the case where the power supply unit turns off the power of the processing unit. FIG. 7 is a sequence diagram showing the operation at the time when the power of the processing system is turned off. It should be noted that the structure of the processing system is simplified for ease of the explanation.

The microcontroller 5 of the power supply unit 1 judges whether the power supply unit 1 is the head power supply unit 1' or the relay power supply unit 1" based on the relationship between the other power supply unit 1 (Step 201) (see, FIG. 7 and [2]).

When it is judged that the power supply unit 1 concerned is the head power supply unit 1' (YES in Step 201), the microcontroller 5 judges whether the user presses the power supply switch 15, and a signal of turning off the power supply switch is input from the power supply switch 15 (Step 202).

When the user presses the power supply switch 15, and the signal of turning off the power supply switch is input (YES in Step 202), the microcontroller 5 performs the subsequent processing of Step 204. On the other hand, when the signal of turning off the power supply switch is not input (NO in Step 202), the microcontroller 5 performs the processing of Step 202 again and judges whether the signal of turning off the power supply switch is input.

That is, when the power supply switch 1 concerned is judged to be the head power supply unit 1', the power source unit 1' is brought into a standby state of turning off the power of the power supply switch 15 provided thereto.

In Step 201, when the power supply switch 1 concerned is not judged to be the head power supply unit 1' (NO in Step 201), that is, when the power supply switch 1 is judged to be the relay power supply unit 1", the microcontroller 5 performs the processing of Step 203.

In Step 203, the microcontroller 5 judges whether a "Shut_down" signal is input from the power supply unit 1 in the front stage.

In the case where the "Shut_down" signal is input from the power supply unit 1 in the front stage (YES in Step 203), the microcontroller 5 performs the subsequent processing of Step 204. On the other hand, in the case where the "Shut_down" signal is not input from the power supply unit 1 in the front stage (NO in Step 203), the microcontroller 5 performs the processing of Step 203 again to judge whether the "Shut_down" signal is input from the power supply unit 1 in the front stage.

That is, when it is judged that the power supply unit 1 concerned is the relay power supply unit 1", the power supply unit 1" is brought into a standby state of the input of the "Shut_down" signal from the power supply unit 1 in the front stage.

In the case where the power supply unit 1 is the head power supply unit 1', when the signal of turning off the power supply switch is input from the power supply switch 15 (YES in Step 202) (see, FIG. 7), or in the case where the power supply unit 1 concerned is the relay power supply unit 1", when the "Shut_down" signal is input from the power supply unit 1 in the front stage (YES in Step 203) (see, FIG. 7), the processing of Step 204 is performed.

In Step 204, the inputs of "Power_OK" signals from the processing unit group 20 connected thereto are counted. As described above, when the voltage of 12 V is supplied from the power supply unit 1, the processing unit 2 outputs the "Power_OK" signal to the power supply unit 1 (see, FIG. 7, [5], and [10]). Therefore, in Step 204, the microcontroller 5 only has to count the "Power_OK" signals. As a result, the microcontroller 5 of the power supply unit 1 can recognize the number of processing units 2 connected thereto.

When the inputs of the "Power_OK" signals is counted, the microcontroller 5 outputs the "Shut_down" signal (shutdown control signal) to the units 1 and 2 by the number of inputs of the "Power_OK" signals plus one sequentially from the side on which the connected position is close to the power supply unit 1 (Step 205) (see, FIG. 7, [7], [8], [11], and [12]).

Here, the microcontroller 5 outputs the "Shut_down" signals to as many units as the inputs of the "Power_OK" signals plus one. Therefore, in the case where the other power supply unit 1 is connected in the rear stage, the "Shut_down" signal is input to the power supply unit in the rear stage (Step 203) (see, FIG. 7). On the other hand, in the case where the other power supply unit 1 is not connected in the rear stage, that is, the power supply unit 1 concerned is the power supply unit 1 of the last stage, the (number of inputs of "Power_OK" signals+1)-th "Shut_down" signal output is come to nothing (see, FIG. 7).

When the "Shut_down" signal is output, the microcontroller 5 terminates the supply of the voltage of 12 V to the processing unit group 20 connected thereto (Step 206) (see, FIG. 7 and [13]) and terminates the processing.

By the processings shown in FIG. 6, the power supply units 1 can sequentially start up the processing units 2 connected thereto from the front stage side and can sequentially starts up the processing units 2 that constitute the processing system 100 from the front stage side in conjunction with the other power supply unit 1. As a result, it is possible to avoid the above-mentioned problem of the order of the turning off of the power in the case of the PCI-Express is used for the connection of the units.

As described above with reference to FIGS. 1 to 6, the processing system 100 according to this embodiment adopts the distribution-type power supply control method in which the power supply units 1 control the supply of the power to the processing unit group 20 connected thereto and control the turn-on and turn-off of the power of the processing unit group 20 connected thereto. In addition, the power supply units 1 can communicate with each other. Therefore, the user can freely structure the processing system 100 of the necessary size by increasing the number of power supply units 1 in accordance with the necessary size to increase the number of the processing units 2.

Further, the power supply unit 1 according to this embodiment automatically judges whether the power supply unit 1 concerned is the head power supply unit 1' or the relay power supply unit 1". Therefore, regardless of the position at which the user disposes the power supply unit 1, the power supply unit 1 can be effectively operated.

In addition, the processing units 2 according to this embodiment each have the structure in which the control signal lines 7 are shifted to the upper level from the input side to the output side stepwise as described above. Therefore, regardless of the positions where the processing units 2 are connected to the power supply unit 1, the processing units 2 can be effectively started up and shut down.

As described above, in this embodiment, although the limitation is imposed on the number of processing units 2 connected to one power supply unit 1, the placement of the power supply units 1 and the processing units 2 is not limited. Therefore, the user can structure the processing system to suit the user's preference by freely combining the units 1 and 2. In addition, even if one of the units 1 and 2 suffers a breakdown for any reason, it is only necessary to exchange the breakdown unit with a new unit without any particular setting or the like with respect to the new one.

<Second Embodiment>

Next, a second embodiment of the present invention will be described.

It should be noted that in the description of the second embodiment, portions having the same structures and functions as those in the first embodiment will be denoted by the same reference numerals or symbols, and their descriptions will be omitted or simplified.

(Structure of Processing System)

Figure 8:
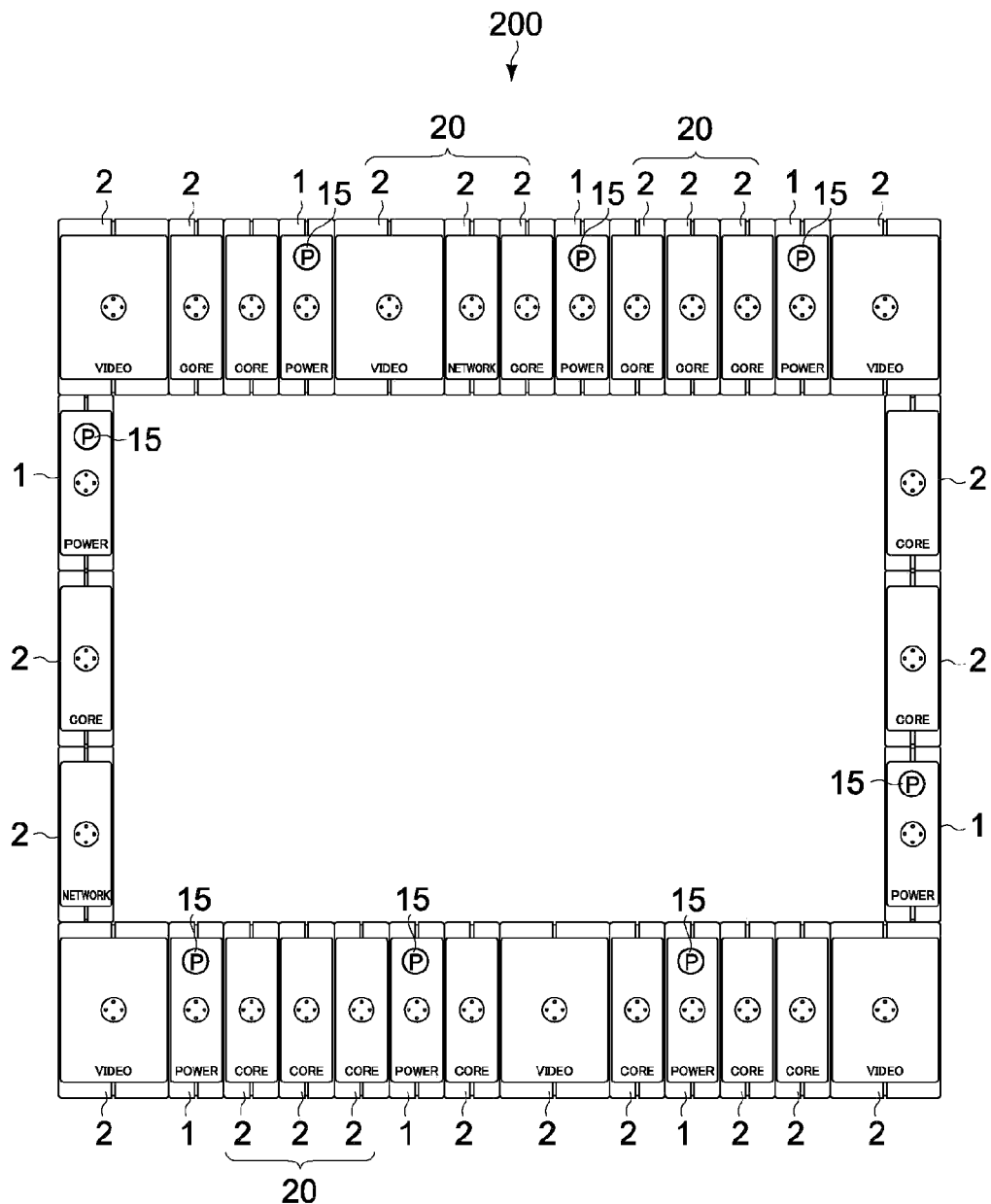
FIG. 8 is a diagram showing a processing system according to another embodiment of the present invention.

FIG. 8 is a diagram showing a processing system according to this embodiment.

As shown in FIG. 8, a processing system 200 is formed by arranging the units 1 and 2 in a ring-shaped form.

As in the first embodiment, the user can arbitrarily select necessary units from among the power supply unit 1, the operation unit 2A, the video unit 2B, and the network unit 2C in accordance with the necessary size to structure the processing system 200 also in the second embodiment. It should be noted that the maximum number of processing units 2 connected to one power supply unit 1 is preset, for example, set to four as in the first embodiment.

Here, as shown in FIG. 8, in the processing system 200 in the second embodiment, the units 1 and 2 are arranged in the ring-shaped form, so the head unit is not defined in the positional relationship among the power supply units 1. In this case, it may be impossible for the power supply units 1 to judge whether to be the head power supply unit 1' or the relay power supply unit 1". In this case, there arises a problem in that, in each of the power supply units 1, it is difficult to determine from which processing unit 2 the startup and shutdown operations are started.

In view of this, in the case where the power supply switch 15 provided to the power supply unit 1 according to this embodiment is pressed, the power supply unit 1 serves as the head power supply unit, and the turn-on and turn-off of the powers of the processing units 2 are controlled in a predetermined order.

(Description on Operation)

A detailed description will be given on the operation of the processing system 200. It should be noted that the operation of the power supply unit 1 will be mainly described in the description on the operation of the processing system 200.

(Processing at Time when Power is Turned on)

First, a processing at a time when the power of the processing system 200 is turned on will be described.

Figure 9:
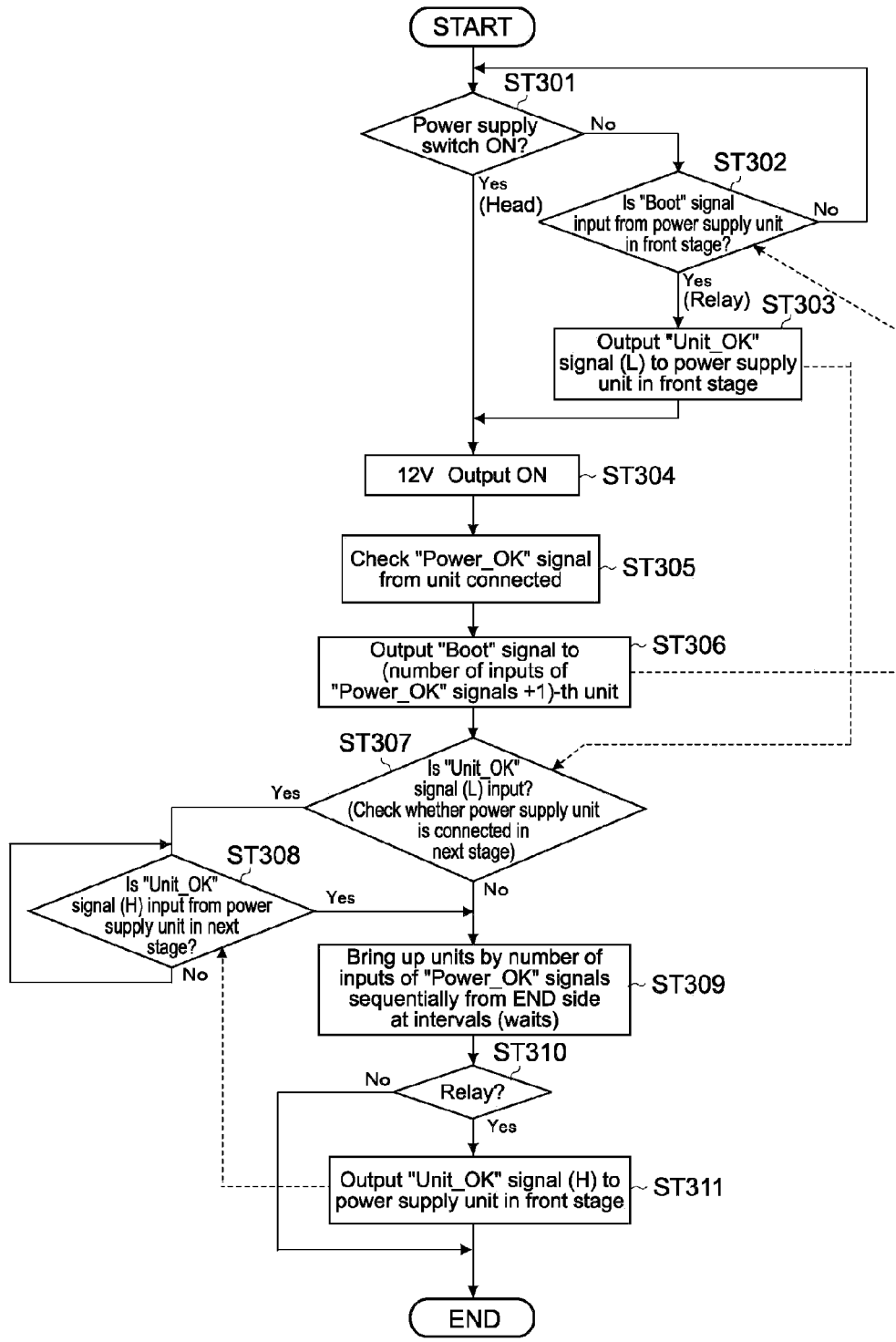
FIG. 9 is a flowchart showing an operation in the case where the power supply unit turns on the power of the processing unit.
Figure 10:
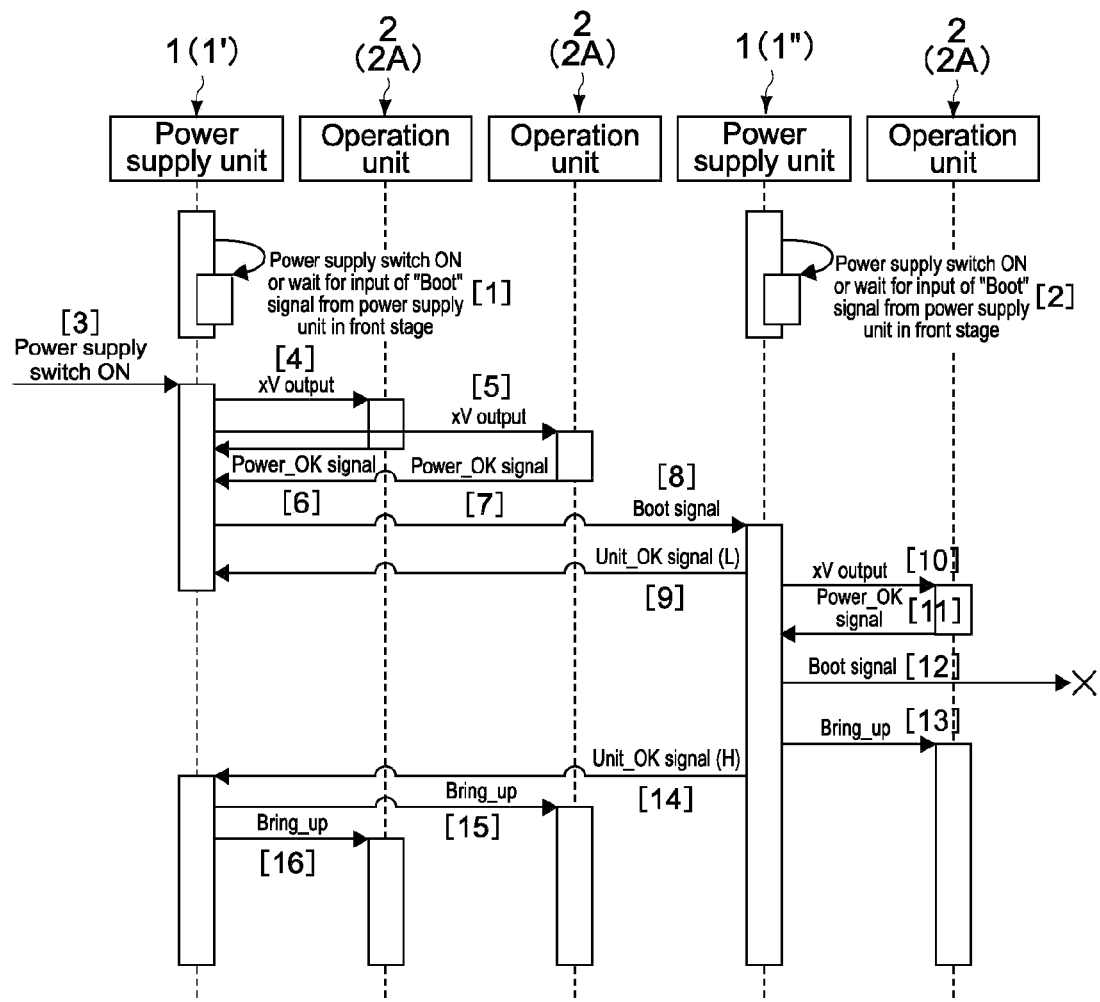
FIG. 10 is a sequence diagram showing a startup operation of the processing system according to the other embodiment of the present invention.

FIG. 9 is a flowchart showing an operation in the case where the power supply unit turns on the power of the processing unit. FIG. 10 is a sequence diagram showing a turn-on operation of the power of the processing system. In FIG. 10, the structure of the processing system 200 is simplified for ease of explanation. In the description of FIG. 9, points different from those of FIG. 4 will be mainly described.

As shown in FIG. 9, the microcontroller 5 of the power supply unit 1 judges whether the power supply switch 15 provided to the power supply unit 1 concerned is pressed, and a signal of turning on the power supply switch is input from the power supply switch 15 (Step 301).

In the case where the signal of turning on the power supply switch is not input from the power supply switch 15 (NO in Step 301), the microcontroller 5 judges whether the "Boot" signal is input from the power supply unit 1 in the front stage (Step 302).

In the case where the "Boot" signal is not input from the power supply unit 1 in the front stage (NO in Step 302), the microcontroller 5 performs the processing of Step 301 again to judge whether the signal of turning on the power supply switch is input from the power supply switch 15.

That is, the power supply units 1 are brought into the standby state of the input of the signal of turning on the power supply switch from the power supply switch 15 thereof or the input of the "Boot" signal from the power supply unit 1 in the front stage (see, FIG. 10 and [2]).

In Step 301, in the case where the power supply switch 15 is pressed by the user (YES in Step 301) (see, FIG. 10), the microcontroller 5 supplies the voltage of 12 V to the processing unit group 20 connected thereto (Step 304) (see, FIG. 10 and [5]). It should be noted that in the case where the power supply switch 15 is pressed by the user, the power supply unit 1 including the power supply switch 15 concerned is set as the head power supply unit 1'.

In Step 302, in the case where the "Boot" signal is input from the power supply unit 1 in the front stage (YES in Step 302) (see, FIG. 10), the microcontroller outputs the "Unit_OK" signal (L) to the power supply unit 1 in the front stage (Step 303) (see, FIG. 10). It should be noted that in the case where the "Boot" signal is input from the power supply unit 1 in the front stage, the power supply unit 1 concerned is set as the relay power supply unit 1".

When the "Unit_OK" signal (L) is output to the power supply unit 1 in the front stage, the microcontroller 5 supplies the voltage of 12 V to the processing unit group 20 connected thereto (Step 304) (see, FIG. 10).

It should be noted that the processings subsequent to Step 304 are the same as those subsequent to Step 105 of FIG. 4, so their descriptions will be omitted.

Figure 13:
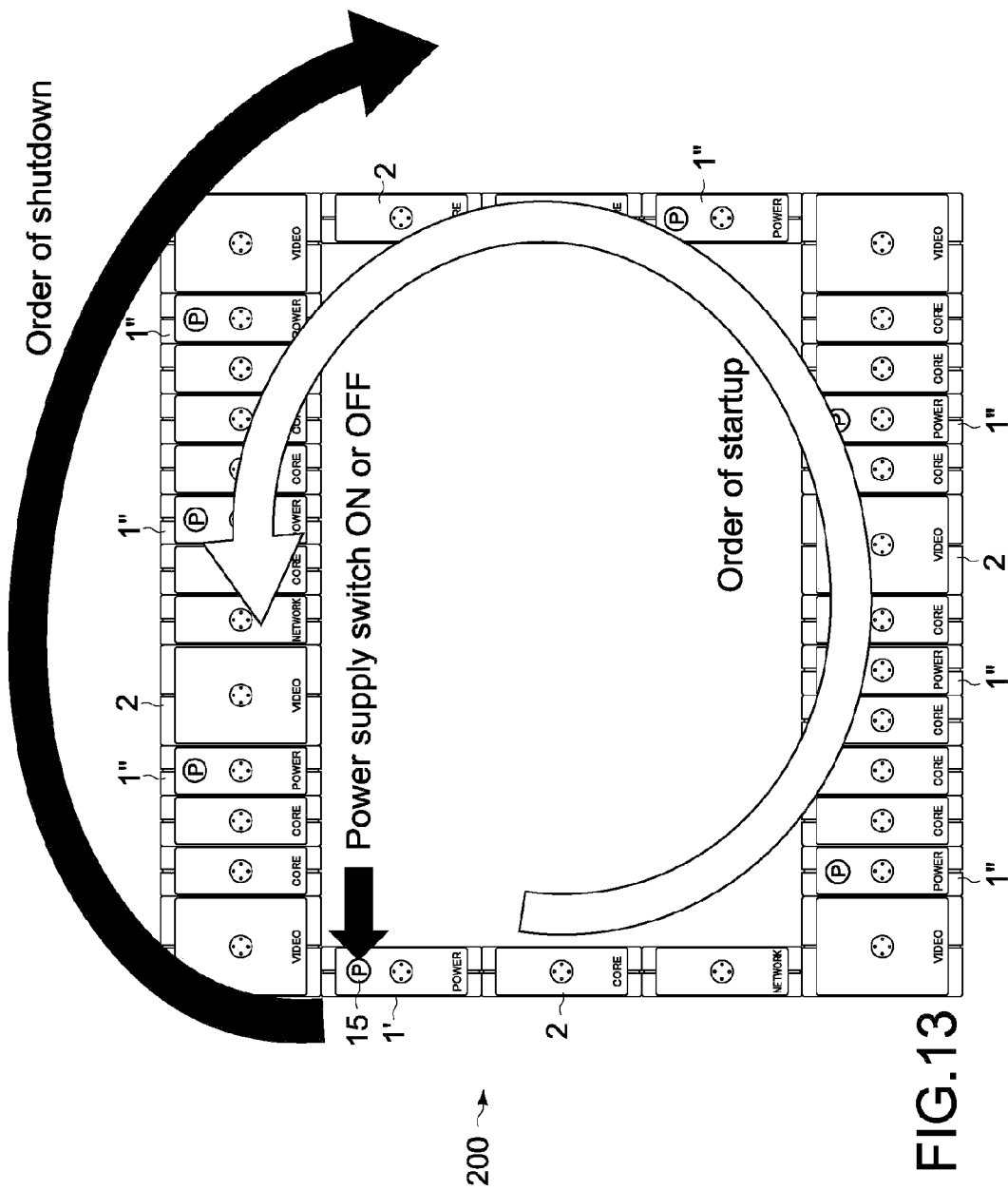
FIG. 13 is a diagram showing an example of an order of a startup operation of the processing system in the case where the processing shown in FIG. 9 is performed, and showing an example of an order of the shutdown operation of the processing system in the case where the processing shown in FIG. 11 is performed.

FIG. 13 is a diagram showing an example of an order of turning on the power of the processing system in the case where the processings shown in FIG. 9 are executed.

As shown in FIG. 13, in the case where the user presses the power supply switch 15 of one power supply unit 1 out of the plurality of power supply units 1 that constitute the processing system 200, the power supply unit 1 concerned is set as the head power supply unit 1'. Further, the other power supply units serve as the relay power supply units 1".

Then, the power supply units 1 are interlocked to power on the processing units 2 in sequence from the processing unit that is farthest from the head power supply unit 1' in the electrical connection relationship (from the processing unit 2 below the head power supply unit 1' in FIG. 13). As a result, as shown in FIG. 13, the startup operation is performed in sequence counterclockwise from the head power supply unit 1'. Thus, it is possible to avoid the problem of the order of the startup operation in the case where the PCI-Express is used for the connection of the units described above.

It should be noted that FIG. 13 shows the case where the startup operation is performed counterclockwise. However, in the case where the electrical connection relationship of the units 1 and 2 is reversed, the startup operation for the processing units 2 is performed clockwise.

(Processing at Time when Power is Turned Off)

Next, a description will be given on processings at a time when the power of the processing system 200 is turned off.

Figure 11:
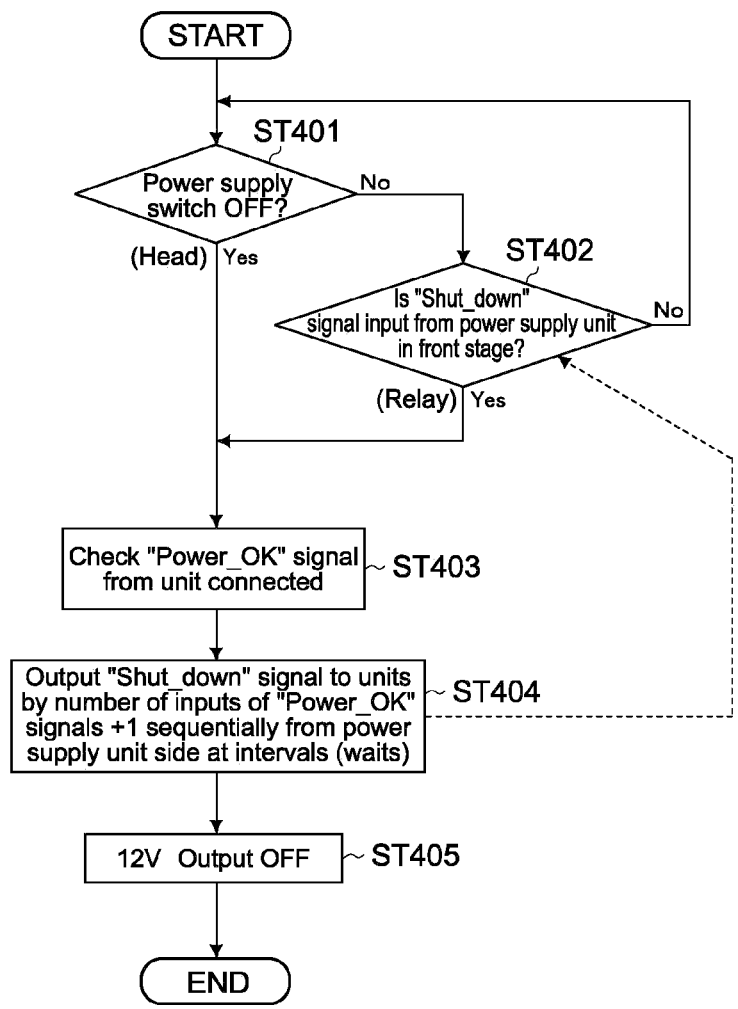
FIG. 11 is a flowchart showing an operation in the case where the power supply unit turns off the power of the processing unit.
Figure 12:
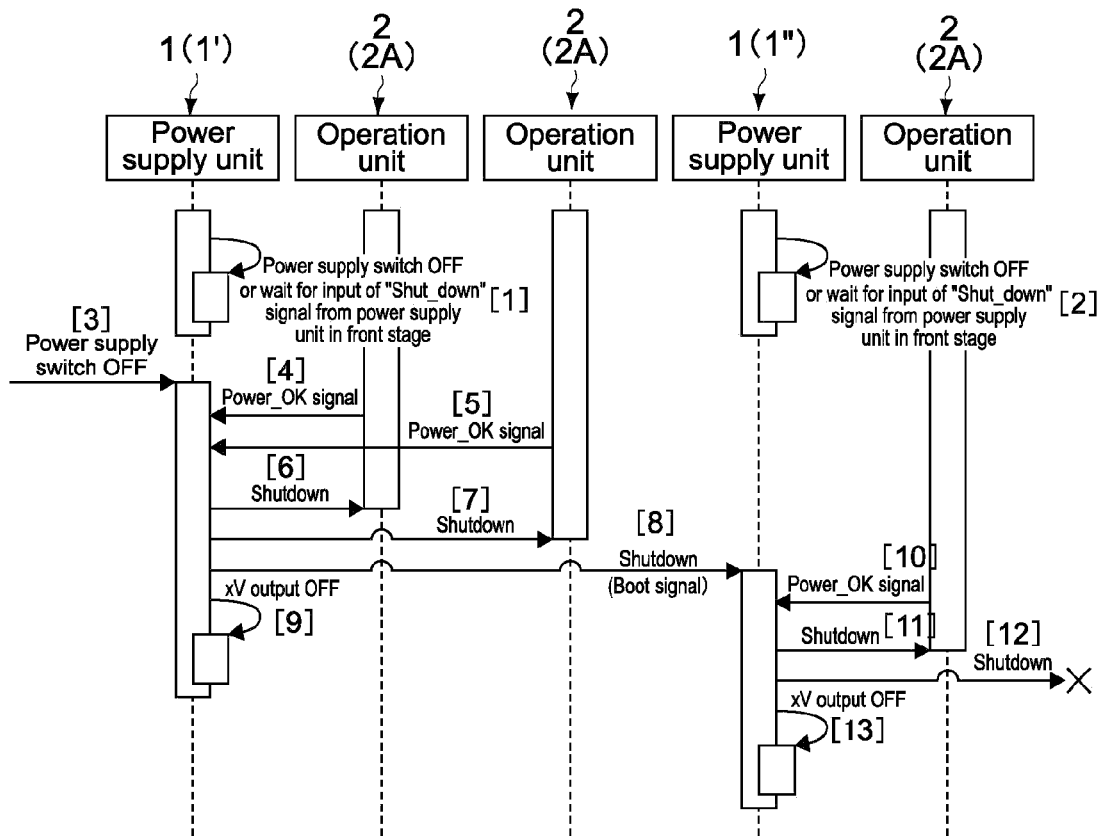
FIG. 12 is a sequence diagram showing a turn-off operation of the power of the processing system according to the other embodiment of the present invention.

FIG. 11 is a flowchart showing an operation in the case where the power supply unit turns off the power of the processing unit. FIG. 12 is a sequence diagram showing the operation of turning off the power of the processing system. In FIG. 12, the structure of the processing system 200 is simplified for ease of explanation. In the description of FIG. 11, points different from those of FIG. 6 will be mainly described.

As shown in FIG. 11, the microcontroller 5 of the power supply unit 1 judges whether the power supply switch 15 provided to the power supply unit 1 concerned is pressed, and a signal of turning off the power supply switch is input from the power supply switch 15 (Step 401).

In the case where the signal of turning off the power supply switch is not input from the power supply switch 15 (NO in Step 401), the microcontroller 5 judges whether the "Shut_down" signal is input from the power supply unit 1 in the front stage (Step 402).

In the case where the "Shut_down" signal is not input from the power supply unit 1 in the front stage (NO in Step 402), the microcontroller 5 performs the processing of Step 401 again to judge whether the signal of turning off the power supply switch is input from the power supply switch 15.

That is, the power supply units 1 are brought into the standby state of the input of the signal of turning off the power supply switch from the power supply switch 15 thereof or the input of the "Shut_down" signal from the power supply unit 1 in the front stage (see, FIG. 12 and [2]).

In Step 401, in the case where the power supply switch 15 is pressed by the user (YES in Step 401) (see, FIG. 12), the microcontroller 5 counts the inputs of the "Power_OK" signals from the processing unit group 20 connected thereto (Step 403) (see, FIG. 12 and [5]). It should be noted that in the case where the power supply switch 15 is pressed by the user, the power supply unit 1 including the power supply switch 15 concerned is set as the head power supply unit 1'.

In Step 402, in the case where the "Shut_down" signal is input from the power supply unit 1 in the front stage (YES in Step 402) (see, FIG. 12), the microcontroller 5 performs the subsequent step of Step 403. It should be noted that in the case where the "Shut_down" signal is input from the power supply unit 1 in the front stage, the power supply unit 1 concerned is set as the relay power supply unit 1".

It should be noted that the processings subsequent to Step 403 are the same as those subsequent to Step 204 of FIG. 6, so their descriptions will be omitted.

FIG. 13 shows an example of an order of the shutdown operation on the processing units 2 in the case where the processings shown in FIG. 11 are executed.

As shown in FIG. 13, in the case where the user presses the power supply switch 15 of one power supply unit 1 out of the plurality of power supply units 1 that constitute the processing system 200, the power supply unit 1 concerned is set as the head power supply unit 1'. Further, the other power supply units serve as the relay power supply units 1".

Then, the power supply units 1 are interlocked to turns off the power of the processing units 2 in sequence from the processing unit that is closest to the head power supply unit 1' in the electrical connection relationship (from the processing unit 2 above the head power supply unit 1' in FIG. 13). As a result, as shown in FIG. 13, the shutdown operation is performed in sequence clockwise from the head power supply unit 1'. Thus, it is possible to avoid the problem of the order of shutdown operation in the case where the PCI-Express is used for the connection of the units described above.

It should be noted that FIG. 13 shows the case where the shutdown operation is performed clockwise. However, in the case where the electrical connection relationship of the units 1 and 2 is reversed, the shutdown operation for the processing units 2 is performed counterclockwise.

(Various Modified Examples)

In the first embodiment described above, the case where the units 1 and 2 have the linear positional relationship is described with reference to FIGS. 1, 2, and the like. However, the positional relationship among the units 1 and 2 is not limited to this. Typically, any positional relationship among the units 1 and 2 can be applied, as long as the electrical connection relationship among the units 1 and 2 is linear.

The same holds true for the processing system 200 according to the second embodiment. That is, any positional relationship among the units 1 and 2 may be applied, as long as the electrical connection relationship among the units 1 and 2 is the ring-shape form.

The present application contains subject matter related to that disclosed in Japanese Priority Patent Application JP 2009-149545 filed in the Japan Patent Office on Jun. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply unit operatively connected to a plurality of processing units, the power supply unit comprising:
a communication unit configured to communicate with a different power supply unit operatively connected to a different plurality of processing units; and
a control unit configured to determine whether the power supply unit is a head power supply unit or a relay power supply unit with respect to the different power supply unit, and control powers of the plurality of processing units connected to the power supply unit such that the plurality of processing units connected to the power supply unit are configured to sequentially turn on or turn off in an order based on whether the power supply unit is a head power supply unit or a relay power supply unit and based on a predetermined priority,
wherein,
the control unit is configured to judge, when the powers are turned on, whether a response signal with respect to a check signal for checking whether the different power supply unit is connected in a rear stage is input from the different power supply unit in the rear stage, and
the control unit is configured to control, when the response is not input, the powers to sequentially turn on the plurality of processing units connected to the power supply unit, and control, when the response signal is input, the powers to sequentially turn on the plurality of processing units connected to the power supply unit after a startup completion signal is input, the startup completion signal indicating that the startup of the different plurality of processing units connected to the different power supply unit in the rear stage is completed.

2. The power supply unit according to claim 1, wherein the control unit is configured to control the powers so that the plurality of processing units connected to the power supply unit are started up turned on in a descending order of distance therefrom in an electrical connection position.

3. A power supply unit operatively connected to a plurality of processing units, the power supply unit comprising:
a communication unit configured to communicate with a different power supply unit operatively connected to a different plurality of processing units; and
a control unit configured to determine whether the power supply unit is a head power supply unit or a relay power supply unit with respect to the different power supply unit, and control powers of the plurality of processing units connected to the power supply unit such that the plurality of processing units connected to the power supply unit are configured to sequentially turn on or and turn off in an order based on whether the power supply unit is a head power supply unit or a relay power supply unit and based on a predetermined priority,
wherein,
the control unit outputs, when the powers of the plurality of processing units are turned off, a turn-off completion signal to the different power supply unit in a rear stage, the turn-off completion signal indicating that the turn-off of the plurality of processing units connected to the power supply unit is completed.

4. The power supply unit according to claim 3, wherein the control unit controls, when a turn-off completion signal is input from another different power supply unit in a front stage, the powers so that the plurality of processing units connected to the power supply unit are sequentially turned off.

5. The power supply unit according to claim 4, wherein the control unit controls the powers so that the powers of the plurality of processing units connected thereto are turned off in an ascending order of distance therefrom in an electrical connection position.

6. A power supply unit operatively connected to a plurality of processing units, the power supply unit comprising:
a communication unit configured to communicate with a different power supply unit operatively connected to a different plurality of processing units;
a control unit configured to determine whether the power supply unit is a head power supply unit or a relay power supply unit with respect to the different power supply unit, and control powers of the plurality of processing units connected to the power supply unit such that the plurality of processing units connected to the power supply unit are sequentially turned on or turned off in an order that is determined based on whether the power supply unit is a head power supply unit or a relay power supply unit and based on a predetermined priority; and
a power supply switch,
wherein,
the control unit is configured to judge, based on a shift of the power supply switch thereof, that the power supply unit including the power supply switch that shifted is the head power supply unit with respect to the different power supply unit.

7. A control method, comprising:
communicating with a first power supply unit operatively connected to a first plurality of processing units;
determining whether a second power supply unit operatively connected to a second plurality of processing units is a head power supply unit or a relay power supply unit with respect to the first power supply unit;
controlling powers of the second plurality of processing units connected to the second power supply unit such that the second plurality of processing units sequentially turn on or turn off in an order based on whether the second power supply unit is a head power supply unit or a relay power supply unit and based on a predetermined priority,
wherein
the determination includes judging that the second power supply unit is the head power supply unit with respect to the first power supply unit if a power supply switch of the second power supply unit has shifted.

* * * * *